(12) United States Patent
Lovegrove (10) Patent No.: US 12,124,927 B2
(45) Date of Patent: Oct. 22, 2024

(54) CLASSIFYING A SURFACE TYPE USING FORCE SENSOR DATA

(71) Applicant: Morphix, Inc., Vancouver, WA (US)

(72) Inventor: Jonathan Lovegrove, Yacolt, WA (US)

(73) Assignee: MORPHIX, INC., Vancouver, WA (US)

( * ) Notice: Subject to any disclaimer, the term of this patent is extended or adjusted under 35 U.S.C. 154(b) by 484 days.

(21) Appl. No.: 17/449,782

(22) Filed: Oct. 1, 2021

(65) Prior Publication Data
US 2023/0104810 A1  Apr. 6, 2023

(51) Int. Cl.
| G06F 11/30 | (2006.01) |
| G01L 1/22 | (2006.01) |
| G01L 5/1627 | (2020.01) |
| G01P 15/02 | (2013.01) |
| G06N 20/00 | (2019.01) |

(52) U.S. Cl.
CPC ............ *G06N 20/00* (2019.01); *G01L 1/22* (2013.01); *G01L 5/1627* (2020.01); *G01P 15/02* (2013.01)

(58) Field of Classification Search
CPC ...................................................... G06N 20/00
See application file for complete search history.

(56) References Cited

U.S. PATENT DOCUMENTS

| 7,353,137 B2 | 4/2008 | Vock et al. |
| 8,080,920 B2 | 12/2011 | Andosca et al. |
| 10,537,767 B2 | 1/2020 | Statham et al. |
| 2019/0000177 A1 | 1/2019 | Dervish et al. |
| 2020/0078638 A1* | 3/2020 | Statham ............... A61B 5/7264 |
| 2022/0014120 A1 | 1/2022 | Andosca et al. |
| 2022/0415515 A1* | 12/2022 | Wegrzyn ............... G16H 50/30 |

OTHER PUBLICATIONS

Muzaffar, S. et al., "Shoe-Integrated, Force Sensor Design for Continuous Body Weight Monitoring," MDPI, vol. 20, No. 12, Jun. 12, 2020, 21 pages.
Nurvv, Representative Website Available at https://www.nurvv.com/en-us/, Website Available as Early as Aug. 7, 2020, 11 pages.
Arion, Representative Website Available at https://www.arion.run/, Website Available as Early as Mar. 29, 2018, 14 pages.

* cited by examiner

*Primary Examiner* — Phuong Huynh
(74) *Attorney, Agent, or Firm* — Alleman Hall & Tuttle LLP (57) ABSTRACT

Examples are disclosed that relate to methods and systems for classifying a surface type. One example provides a system comprising a wearable device comprising at least one force sensor, and a computing device having a processor and associated memory storing instructions executable by the processor. The instructions are executable by the processor to, during a training phase, receive training data including a plurality of training data pairs. Each training data pair includes force sensor training data received from the at least one force sensor, or from a simulation or observation, and a label indicating at least one of a plurality of defined surface types. An AI model is trained to predict a classified surface type based on run-time force sensor data. The run-time force sensor data is input into the trained AI model to thereby cause the AI model to output a predicted classification of a run-time surface type.

20 Claims, 9 Drawing Sheets

FIG. 1
*TRAINING PHASE*

FIG. 4
*RUN-TIME PHASE*

CLASSIFYING A SURFACE TYPE USING FORCE SENSOR DATA

BACKGROUND

There are many applications in which a wearable device is used to measure aspects of a person on foot. In one example, shoe sensors have been provided to estimate a person's bodyweight and gait. In another example, sensors have been provided in fitness trackers that are used to estimate a pace, distance traveled, and calories consumed by a person while walking or running. In particular, estimates of dynamic movement of this sort are subject to error. One factor that may contribute to such error is that the surface or terrain being traversed by the user can vary significantly from the assumptions made by the computerized model of the activity. This can be especially true, for example, for a long-distance hiker or soldier in the field, for example, either of whom might travel over hardpack, asphalt, sand and grassy terrain in a single journey. Therefore, a technical challenge exists to characterize the surface over which a user is traveling based upon sensor data.

SUMMARY

In view of the issues discussed above, according to one aspect of the present disclosure, a system comprises a wearable device comprising at least one force sensor located between a user's foot and a surface, and a computing device having a processor and associated memory storing instructions executable by the processor. The instructions are executable by the processor to, during a training phase, receive training data including a plurality of training data pairs. Each training data pair includes, as input, force sensor training data, wherein the force sensor training data is received from the at least one force sensor as the user is traversing the surface during a training session, or from a simulation or observation of one or more other force sensors, and as ground-truth output, a label indicating at least one of a plurality of defined surface types. The instructions are further executable to train an artificial intelligence (AI) model using the plurality of training data pairs to predict a classified surface type based on run-time force sensor data. During a run-time phase, the instructions are executable to monitor the run-time force sensor data from the at least one force sensor as the user is traversing a run-time surface type, wherein the run-time surface type is one of the plurality of defined surface types. The run-time force sensor data is input into the trained AI model to thereby cause the AI model to output a predicted classification of the run-time surface type.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

To address the issues discussed above, and with reference now to FIG. 1, a system 100 is provided for classifying a surface type. The system 100 comprises a wearable device 102 comprising at least one force sensor 104. As described in more detail below with reference to FIG. 2, the at least one force sensor 104 is located between a user's foot and a surface 106.

Figure 1:
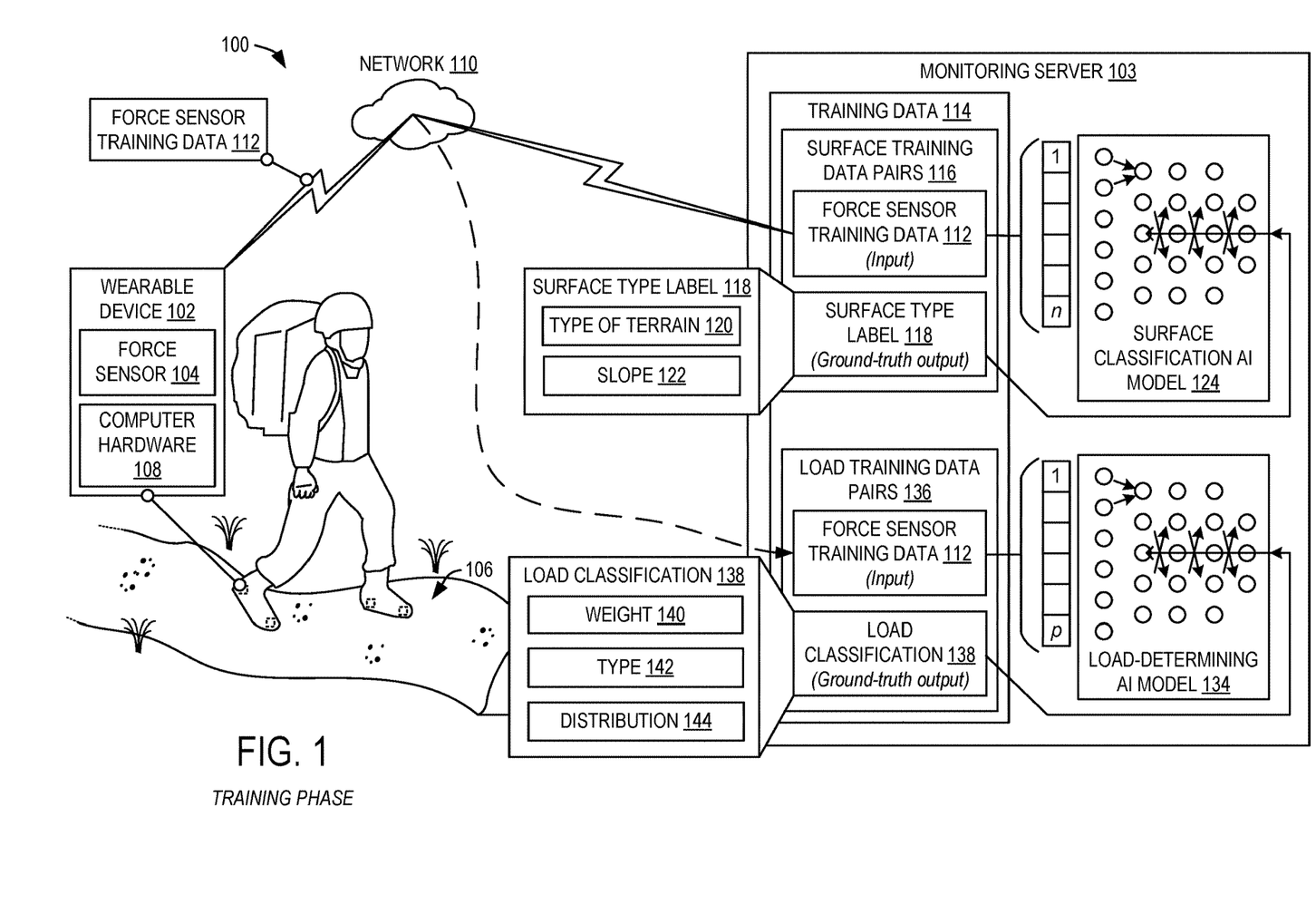
FIG. 1 shows one example of a system for classifying a surface type during a training phase based upon force sensor data received from a wearable device.
Figure 2:
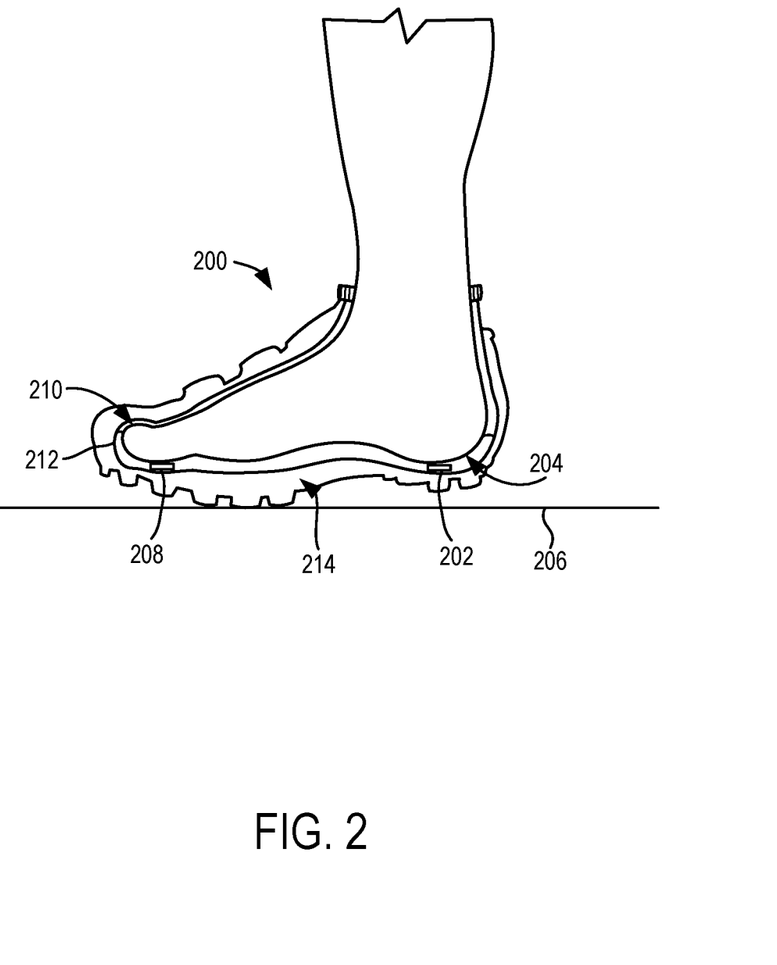
FIG. 2 shows one example of a wearable device that may be used as the wearable device of FIG. 1.

FIG. 2 shows one example of a wearable device that takes the form of a shoe 200. The shoe 200 can serve as the wearable device 102 of FIG. 1. It will also be appreciated that the wearable device may comprise any other suitable wearable item. Some examples of suitable items include an insole, a sock, a sandal, and an ankle band.

The shoe 200 comprises a first force sensor 202 that is located between a user's heel 204 and a surface 206. The shoe 200 further comprises a second force sensor 208 that is located between the user's toe 210 and the surface. It will be appreciated that any other suitable number of force sensors may be used. For example, the shoe 200 may comprise one, three, or more force sensors. Using a single force sensor can simplify the structure of the shoe 200 and reduce the complexity of data processing, whereas two or more force sensors can be used to capture additional features of the user's interaction with the terrain, such as a weight distribution between the force sensors. It will also be appreciated that one or more of the force sensors may be located at any other suitable position.

In some examples, the first force sensor 202 and the second force sensor 208 each comprise a load cell, a strain gauge, a force-sensitive resistor, or an inertial measurement unit (IMU). The load cell, strain gauge, or force-sensitive resistor convert an input mechanical load, compression, or pressure on the force sensor into an electrical output signal. Load cells, strain gauges, and force-sensitive resistors may be simpler and more cost-effective force sensors than an IMU. However, an IMU may output an acceleration and angular rate of the wearable device, which can be used to determine the forces on the device. In a system comprising two or more IMUs (e.g., one on each shoe), the system can track the motion of each sensor with respect to one another, which can be used, alone or in combination with other types of force sensor data, to classify a surface. For example, tracking the motion of two or more IMUs may indicate that the user has an unstable footing, is sliding on a slippery surface, etc. In other examples, the first force sensor 202 and the second force sensor 208 may each comprise a different sensor. It will also be appreciated that any other suitable type of sensor may be used.

As shown in FIG. 2, the first force sensor 202 and the second force sensor 208 are located in an insole 212 of the shoe 200. In some examples, the insole can function as a modular or interchangeable device that can be inserted into a user's footwear to enable the force sensing functionality disclosed herein. In other examples, the insole 212 may be tied to a particular wearable item (e.g., a specific pair of shoes). In yet other examples, the force sensors can be incorporated into any other suitable portion of the wearable device (e.g., in a midsole 214 of the shoe 200).

With reference again to FIG. 1, the system 100 comprises a computing device having a processor and associated memory storing instructions executable by the processor. In the example of FIG. 1, the computing device takes the form of a monitoring server 103. Additional details regarding the computing hardware of the monitoring server 103 are provided below with reference to FIG. 9. It will also be appreciated that the system 100 may comprise two or more computing devices, and the computing device(s) may comprise any other suitable type of computing device. As one example, the data from the force sensor(s) 104 in the wearable device 102 may be obtained wirelessly by a mobile device (e.g., a smartphone or smart watch) carried by the user (e.g., in the user's hand, clothing, or a backpack). In this manner, the wearable device 102 may have two parts: one comprising the force sensor(s) 104 and another comprising a communication unit that wirelessly receives data from the force sensor(s) 104 and communicates it to the monitoring server 103. As one potential advantage of this configuration, the communication unit may have a larger battery that would be challenging to implement at the wearable device 102, helping to power a wireless radio for communications with the monitoring server 103.

The wearable device 102 further comprises computer hardware 108 configured to communicate with the server system 103 via a computer network 110. Additional details regarding the computing hardware 108 and the network 110 are provided below with reference to FIG. 9. Accordingly, and as described in more detail below, the monitoring server 103 can receive force sensor data from the wearable device 102.

The monitoring server 103 is further configured to, during a training phase, receive training data 114 including a plurality of surface training data pairs 116. Each training data pair 116 includes, as input, the force sensor training data 112. The force sensor training data 112 is received from the at least one force sensor 104 as the user is traversing the surface 106 during a training session, or from a simulation or observation of one or more other force sensors as the user is traversing that surface 106. For example, the force sensor training data may be simulated in silico at the monitoring server 103 or another suitable computing device. In other examples, the surface training data pairs 116 are populated by conducting one or more training sessions in a real-world environment, in which one or more real-world force sensors (which may include the force sensor 104 of the wearable device 102 or another force sensor) are employed by the user, a different user, or a simulated user (e.g., a robot) traversing a real-world surface.

Each training data pair 116 further includes, as groundtruth output, a surface type label 118 indicating at least one of a plurality of defined surface types. In some examples, the surface type label 118 includes one or more of a type of terrain 120 comprising the surface 106 or a slope 122 of the surface 106. The type of terrain 120 may comprise sand, dirt, grass, etc. The slope label 122 may indicate whether the surface 106 is uphill, downhill, or flat. It will also be appreciated that the surface type label 118 may comprise any suitable property of the surface 106 that can be determined using the force sensor 104.

Figure 3:
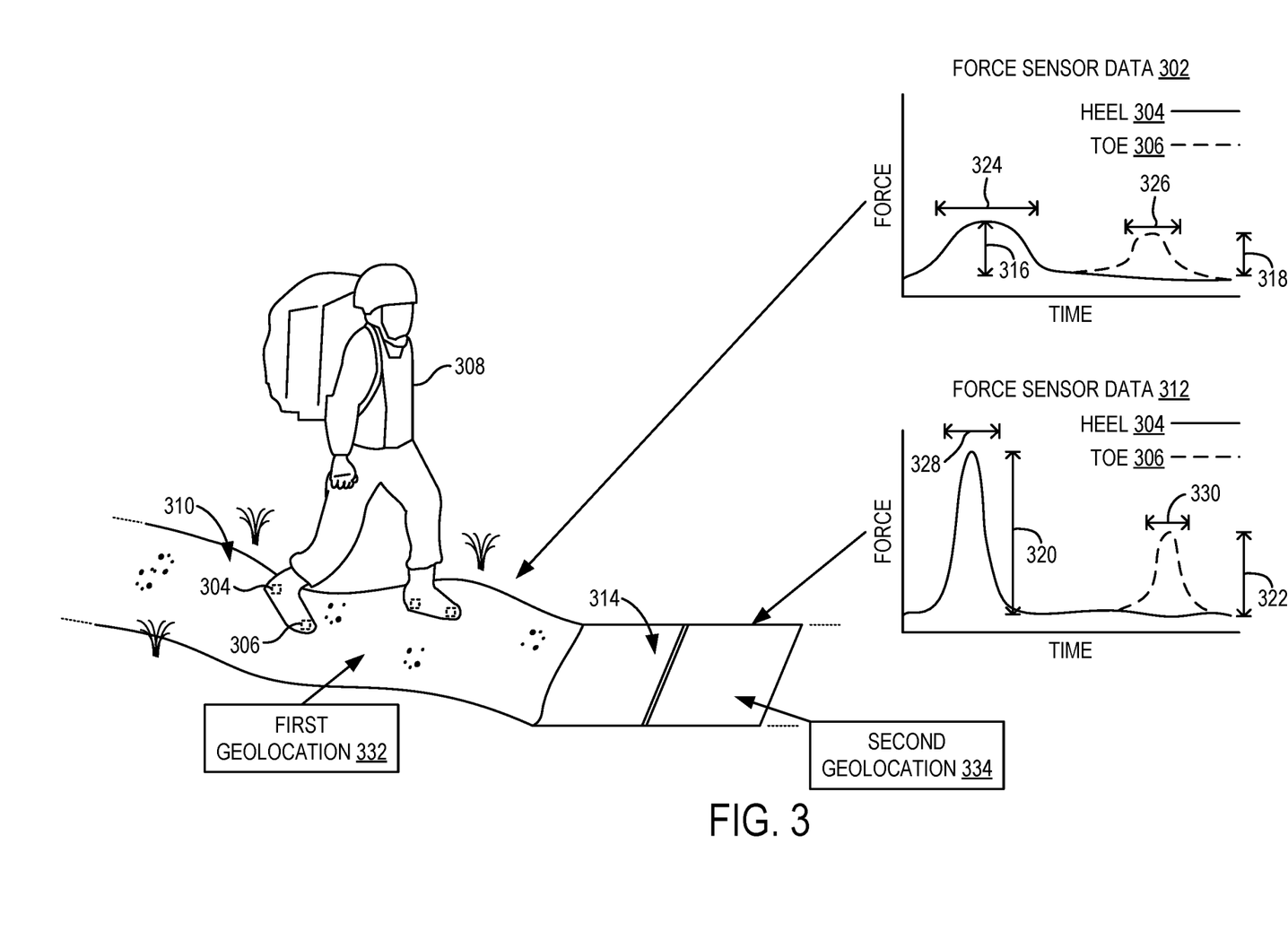
FIG. 3 shows prophetic examples of force sensor training data for two different surfaces.

FIG. 3 shows prophetic examples of force sensor data for two different surfaces. A first prophetic example of force sensor data 302 is shown that may be received from force sensors 304 and 306 worn by a user 308 while descending a sloped dirt trail 310. A first force sensor 304 is located between the user's heel and the trail 310. A second force sensor 306 is located between the user's toe and the trail 310. A second prophetic example of force sensor data 312 is shown that may be received from the force sensors 304 and 306 while the user 308 is traversing a flat concrete sidewalk 314.

The dirt surface 310 is softer than the concrete sidewalk 314. Accordingly, a magnitude of the force sensor data 302 may be less than a magnitude of the force sensor data 312. For example, an amplitude 316 of the heel force sensor data and an amplitude 318 of the toe force sensor data may be smaller than corresponding amplitudes 320 and 322 of the heel and toe force sensor data, respectively, on the concrete sidewalk 314. In addition, the dirt surface 310 may deform to distribute the user's weight over a larger area than on the concrete sidewalk 314. Accordingly, a width 324 of the force curve of the heel force sensor data and a width 326 of the force curve of the toe force sensor data may be larger than corresponding widths 328 and 330 of the force curve of the heel and toe force sensor data, respectively, on the concrete sidewalk 314. These patterns can be classified using an AI model trained to determine the type of terrain traversed by the user 308.

In addition, while the user 308 is descending on the trail 310, the user's weight may be shifted forward onto the user's toes, more than on the flat sidewalk 314. Accordingly, the ratio of the amplitude 318 to the amplitude 316 of the force curve of the force sensor data 302 corresponding to the trail 310 may be larger than the ratio of the amplitude 322 to the amplitude 320 corresponding to the sidewalk 314. These patterns can be classified using an AI model trained to determine the slope of the surface 310 or 314. Further, other features such as the skew, mean, median, mode, attack slope, decay slope, symmetry, etc. can be captured by feature extraction layers within a convolutional neural network of the AI model and used to classify the force curves.

In the example of FIG. 1, the plurality of surface training data pairs 116 are used to train an artificial intelligence (AI) model 124 to predict a classified surface type based on run-time force sensor data. The run-time implementation of the trained AI model 124 is illustrated in FIG. 4.

It will be appreciated that the particular set of features included in the surface training data pairs 116 during the training phase will be included for each and every training session and in-field asset, and will also be included in the input vector in the run time phase, with each condition indicated on a normalized scale of zero to one. Thus, if force sensor data is received from two force sensors 104, then entries in the training data set 114 will be included for each of these force sensors in each training session. When a particular feature is present in one session or from one device, but is not present in another session or from another device, it will be indicated as zero when it is not present.

In some examples, the surface classification AI model 124 includes a neural network. The training may take place using any suitable method(s), such as by using backpropagation with gradient descent. As the neural network is trained, an input vector (e.g., a vector comprising a normalized form of the force sensor training data 112) and matched ground truth labels (e.g., the surface type label 118), which can be classifications or scalar values, are applied to an input layer and an output layer respectively, and the weights in the network are computed through gradient descent and the backpropagation algorithm, for example, such that the trained neural network will properly classify (or properly value) the input vector to the matched ground truth classification or scalar value in the output layer. In other examples, another suitable artificial intelligence model may be used, such as neural network of another structure, a support vector machine, etc.

Figure 4:
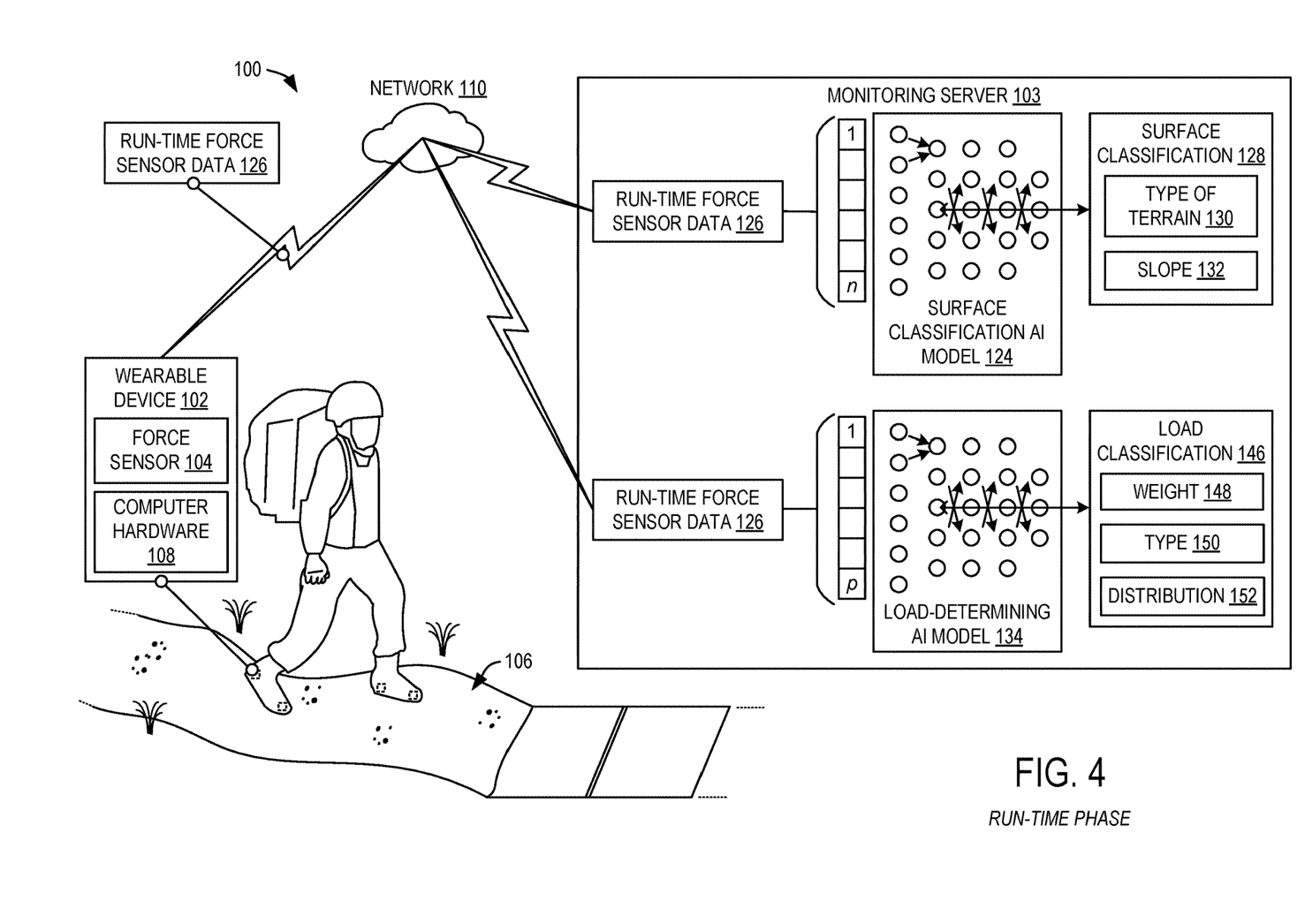
FIG. 4 shows one example of a run-time implementation of the system of FIG. 1.

In a run-time implementation, one example of which is depicted in FIG. 4, the monitoring server 103 is further configured to monitor run-time force sensor data 126 from the at least one force sensor 104 as the user is traversing a run-time surface type (e.g., the surface 106). The run-time surface type is one of the plurality of defined surface types, which were previously defined during the training phase. The run-time force sensor data corresponds to the force sensor training data 112.

The run-time force sensor data 126 is input into the trained surface classification AI model 124, to thereby cause the AI model to output a predicted classification 128 of the run-time surface type. The output classification corresponds to the labels used during the training phase. For example, the predicted classification 128 of the run-time surface type may comprise one or more of a type of terrain 130 comprising the surface 106 or a slope 132 of the surface 106.

The predicted classification 128 of the run-time surface type may be output to any suitable device or combination of devices. For example, the predicted classification 128 may be output to a user interface device, such as an in-field computing device (e.g., a smartphone, a tablet, or a laptop computing device), or a remote computing device (e.g., a workstation in a remote command center). The user interface device may be configured to display or otherwise present the predicted classification 128 to a user via a display or any other suitable output component(s). In other examples, the predicted classification 128 can be output to any other suitable device or combination of devices, such a computing device for downstream processing.

Advantageously, the surface classification 128 may be used to enhance situational awareness around the user. For example, the predicted type of terrain 130 output by the AI model 124 may be used to determine a level of physical exertion involved in traversing the surface 106. As another potential application, the predicted type of terrain 130 may help a medical professional make a diagnosis. For example, the output of the AI model 124 may be used to correlate a patient's medical complaint (e.g., back pain) to one or more types of terrain (e.g., hard surfaces).

In another example, one or more defined surfaces may be associated with a location. In the example of FIG. 3, the dirt trail 310 may be mapped to a first geolocation 332 and the concrete sidewalk may be mapped to a second geolocation 334 different from the first geolocation 332. Accordingly, a computing device (e.g., the monitoring server 103 of FIGS. 1 and 4) may determine that the user is at the location based upon the classified surface type. For example, when the classified surface type indicates that the user 308 is on a down-sloping dirt surface, the computing device may determine that the user 308 is at the first geolocation 332. When the classified surface type indicates that the user 308 is on a flat, hard surface, the computing device may determine that the user 308 is at the second geolocation 334. The indicated surface type may additionally or alternatively be used to make or augment a map.

In yet another example, the user may be a medical patient and the classified surface type may be used to determine compliance with a prescribed medical treatment plan. For example, the classified surface type may indicate whether the patient is using a staircase or an accessibility ramp.

With reference again to FIG. 1, in some examples, the user is bearing a load, and the system is further configured to determine one or more characteristics of the load. the one or more characteristics of the load comprise one or more of a weight of the load, a type of the load, or a distribution of the load on the user's body. The system may determine the characteristics of the load deterministically, using AI, or using any other suitable method.

Figure 5:
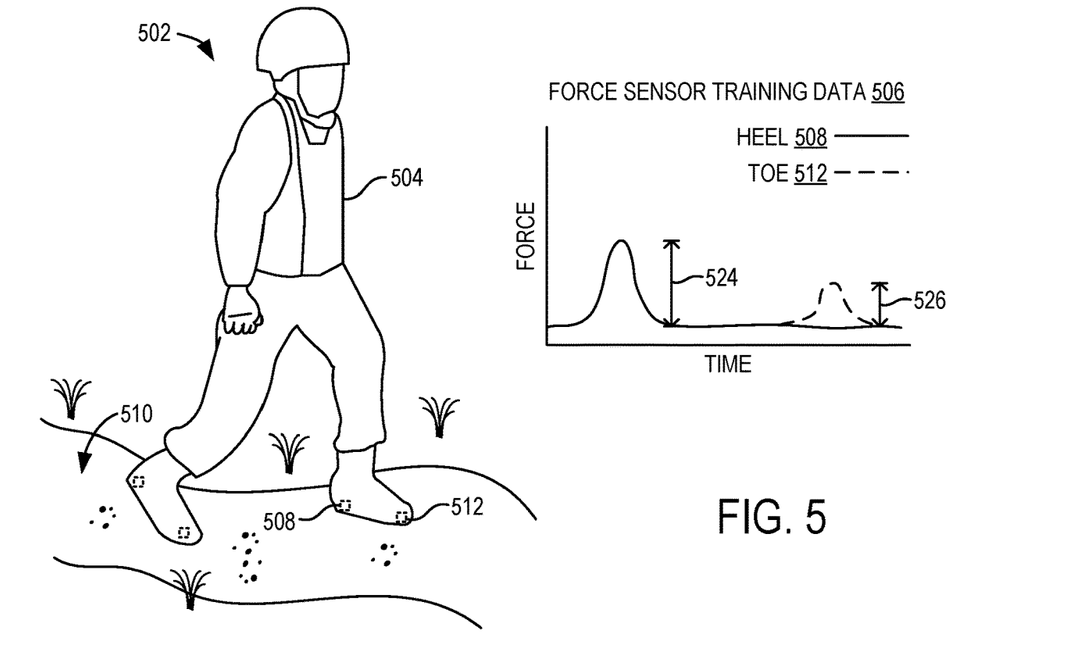
FIGS. 5-7 show prophetic examples of force sensor data for a user bearing a variety of loads.

In one example, the force sensor training data is obtained while the user is bearing a defined load. FIG. 5 shows one example use-case scenario in which a user 502 is wearing a military-style uniform 504, and is not carrying an additional load. In this example, the defined load has a zero mass. FIG. 5 also shows a prophetic example of force sensor training data 506 that may be received from a first force sensor 508 located between the user's heel and a surface 510. A second force sensor 512 is located between the user's toe and the surface 510.

Figure 6:
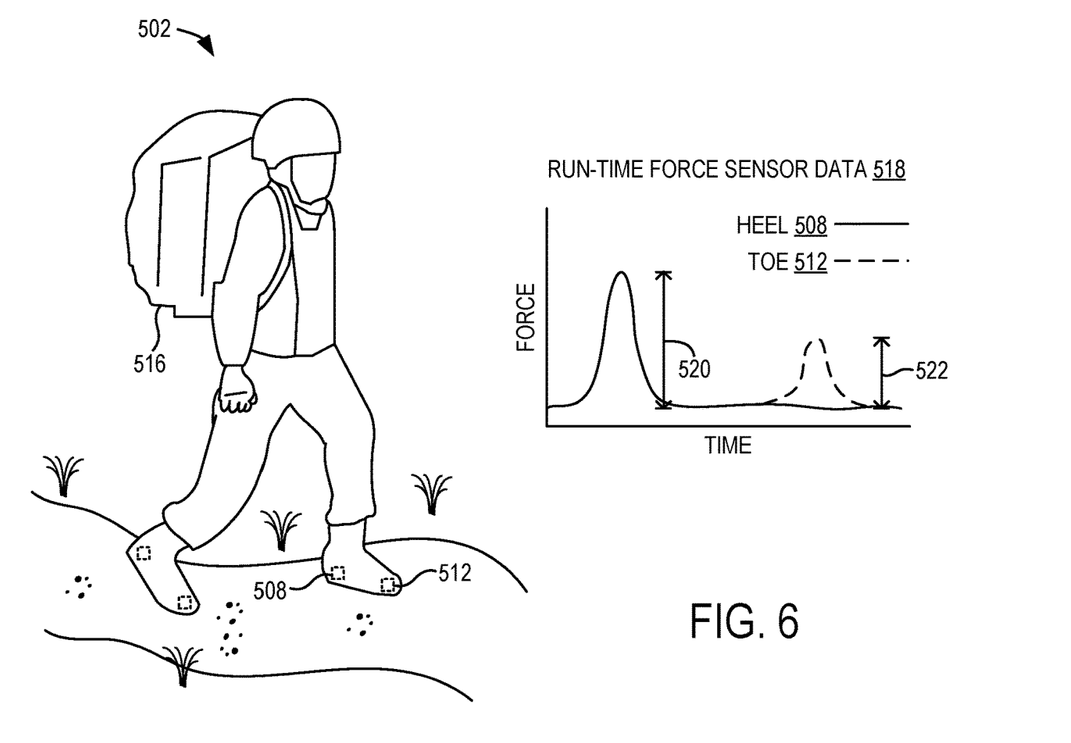

FIG. 6 shows the user 502 bearing an additional load in the form of a backpack 516 at runtime. FIG. 6 also shows a prophetic example of run-time force sensor data 518 that may be received from the first force sensor 508 and the second force sensor 512. With the additional load in FIG. 6, an amplitude 520 of the heel force sensor data and an amplitude 522 of the toe force sensor data are greater than corresponding amplitudes 524 and 526 in the force sensor training data 506 of FIG. 5.

In some examples, one or more characteristics of the load can be determined by contrasting a magnitude of the run-time force sensor data 518 with a magnitude of the force sensor training data 506. As described in more detail below, the one or more characteristics of the load may include one or more of a weight of the load, a type of the load, or a distribution of the load on the user's body. For example, the difference between one or more of the amplitudes 520 or 522, and the amplitudes 524 and 526, may be used to determine the weight of the backpack 516. As an alternative example, the area under the force curve may be used to determine the weight of the backpack.

Figure 7:
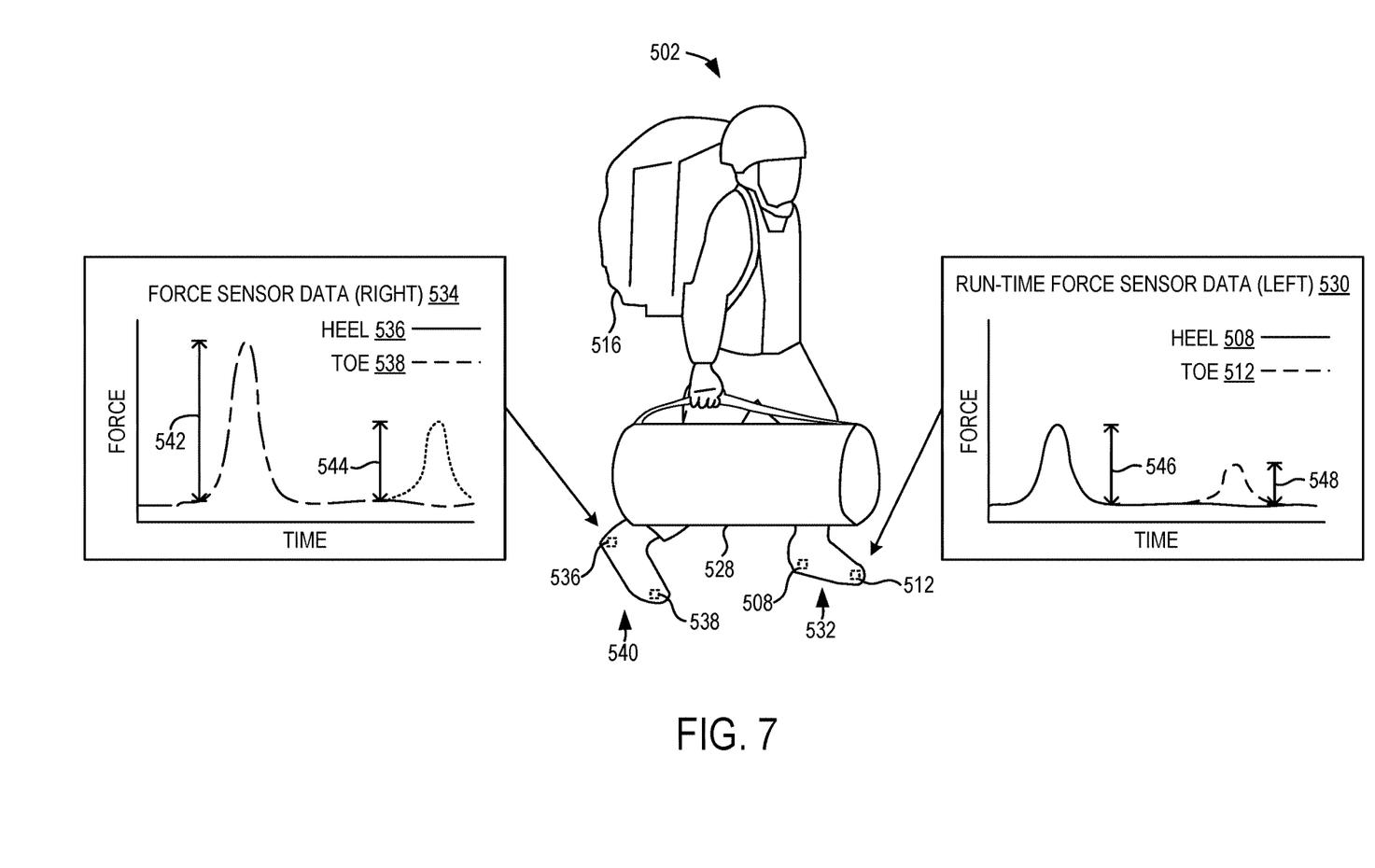

FIG. 7 shows another example of a use-case scenario in which the user 502 is wearing the backpack 516 and carrying a duffel bag 528 in his or her right hand. FIG. 7 also shows a prophetic example of force sensor data 530 for the force sensors 508, 512 on the user's left foot 532, and a prophetic example of force sensor data 534 for another heel force sensor 536 and another toe force sensor 538 on the user's right foot 540. As the duffel bag 528 is in the user's right hand, more of the weight of the duffel bag may be distributed on the user's right foot 540 than the user's left foot 532. Accordingly, the force sensor data 534 of the heel force sensor 536 and the toe force sensor 538 on the user's right foot 540 may have larger amplitudes 542 and 544, respectively, than amplitudes 546 and 548 of the force sensor data 530 of the heel force sensor 508 and the toe force sensor 512, respectively, on the user's left foot 532. Accordingly, the distribution of the load on the user, for example, in a right left direction and in a fore aft direction, can be determined by monitoring the force sensor data 530 and 534. As one specific example, the system may compute a projection of the centroid of the user plus load onto the ground plane.

The force sensor data 530 and 534 can also indicate a type of the run-time load. The force sensor data may include a signature pattern associated with carrying a particular item. For example, the duffle bag 528 may swing while the user 502 is walking, causing the user 502 to walk with a different gait than when the duffle bag 528 is not present, which can be recognized via the force sensors and used to determine that the user 502 is carrying the duffel bag.

In some examples, the one or more characteristics of the load described above can be determined using AI. For example, the system 100 of FIGS. 1 and 4 includes a load-determining AI model 134. In some examples, the training data 114 received during the training phase includes a plurality of load training data pairs 136. Each load training data pair includes, as input, the force sensor training data 112. The force sensor training data 112 is received while the user is bearing at least one load of a plurality of defined loads, while simulating the at least one load, or while observing one or more other force sensors bearing the at least one load.

Each load training data pair also includes, as ground-truth output, a ground-truth load classification 138 of the at least one load. In some examples, the ground-truth load classification 138 includes one or more of a weight 140 of the run-time load, a type 142 of the run-time load, or a distribution 144 of the run-time load on the user's body. The type 142 of the run-time load may indicate, for example, whether the user is carrying a backpack, a duffel bag, etc.

The plurality of load training data pairs 136 are used to train the load-determining AI model 134 to predict a run-time load classification 146 based on the run-time force sensor data 126. The run-time implementation of the load-determining AI model 134 is illustrated in FIG. 4. In some examples, the load-determining AI model 134 is analogous to the surface classification AI model 124. For example, the load-determining AI model 134 may comprise a neural network that is trained and operated in a similar manner to the surface classification AI model 124. In other examples, the load-determining AI model 134 may comprise any other type of AI model, which can be used and trained in any other suitable manner.

At runtime, the run-time force sensor data 126 is input into the trained load-determining AI model 134 to thereby cause the load-determining AI model to output a predicted classification 146 of a run-time load. The output classification corresponds to the labels used during the training phase. For example, the predicted classification 146 of the run-time load may comprise one or more of a weight 148 of the run-time load, a type 150 of the run-time load, or a distribution 152 of the run-time load on the user's body.

Like the surface classification 128, the load classification 146 be used to enhance situational awareness around the user. For example, the distribution 152 of the load can be used to study the ergonomics of how the user is carrying the load. This classification could be used by a medical professional to correlate a patient's medical complaint (e.g., back pain) to the load.

In the example of FIGS. 1 and 4, the load-determining AI model 134 is implemented on the same computing device as the surface classification AI model 124. It will also be appreciated that the surface classification AI model 124 and the load-determining AI model 134 may be implemented on different computing devices.

In some examples, the surface classification AI model 124 and the load-determining AI model 134 may operate independently of one another. In other examples, the surface classification 128 output by the surface classification AI model 124 may be input into the load-determining AI model 134, and/or the load classification 146 output by the load-determining AI model 134 may be input into the surface classification AI model 124. As described above, the surface type and load characteristics can alter patterns in the force sensor data. Advantageously, the surface classification 128 and/or the load classification 146 may be used to inform the AI models of predicted surface and load characteristics.

Figure 8A:
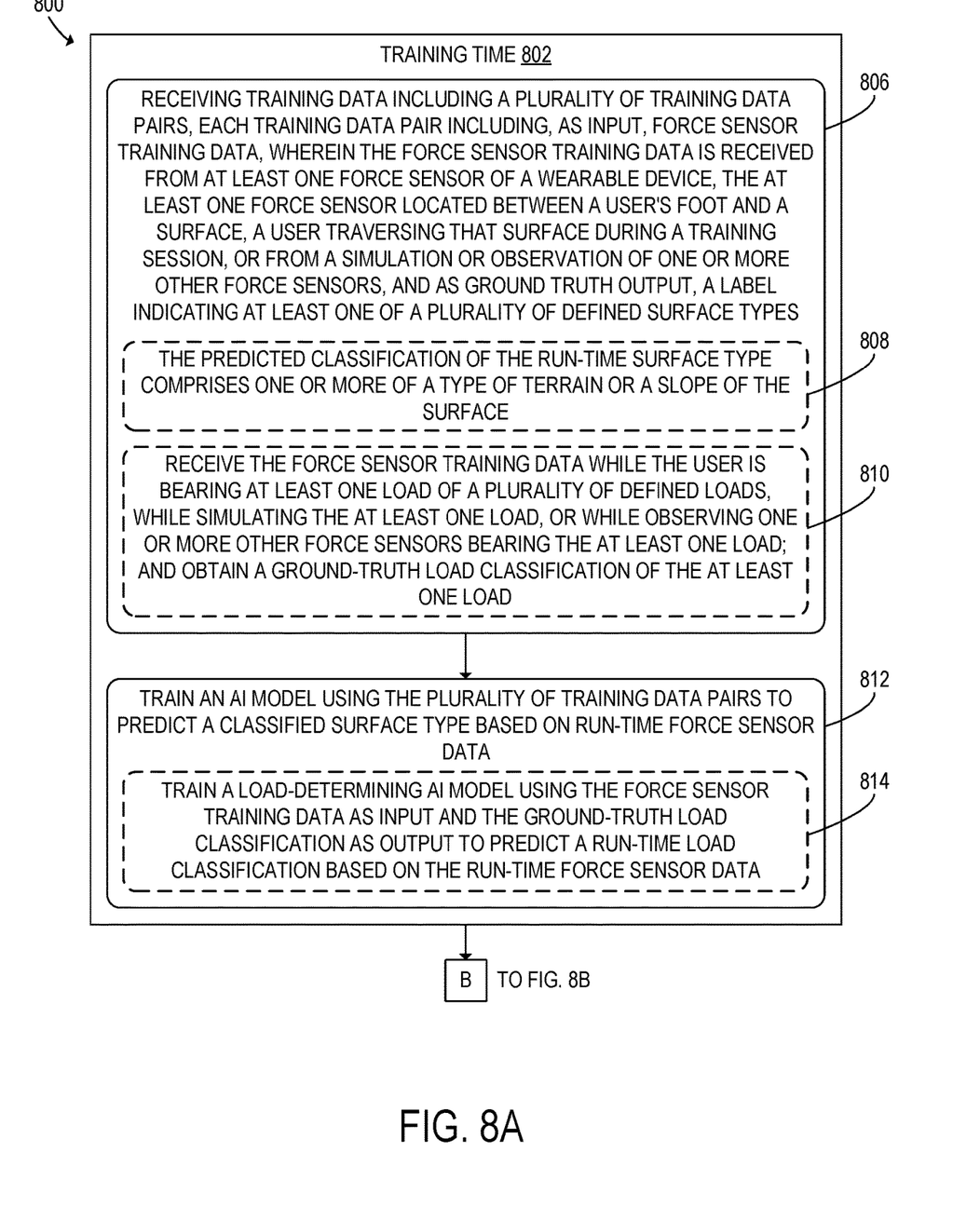
FIGS. 8A-8B show a flowchart of an example method for classifying a surface type, according to one example embodiment.
Figure 8B:
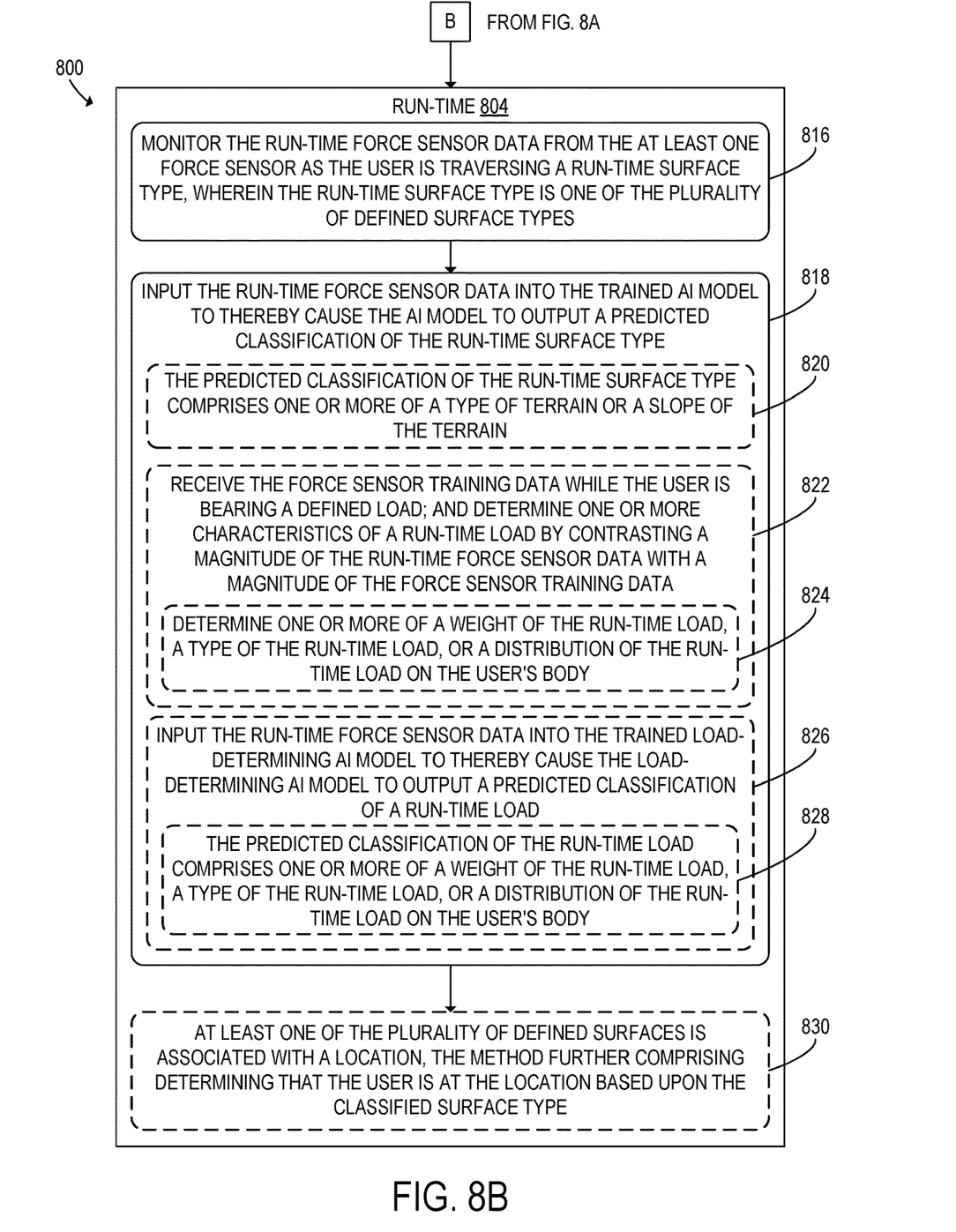

With reference now to FIGS. 8A-8B, a flowchart is illustrated depicting an example method 800 for classifying a surface type. The following description of method 800 is provided with reference to the software and hardware components described above and shown in FIGS. 1-7 and 9, and the method steps in method 800 will be described with reference to corresponding portions of FIGS. 1-7 and 9 below. It will be appreciated that method 800 also may be performed in other contexts using other suitable hardware and software components.

It will be appreciated that the following description of method 800 is provided by way of example and is not meant to be limiting. It will be understood that various steps of method 800 can be omitted or performed in a different order than described, and that the method 800 can include additional and/or alternative steps relative to those illustrated in FIGS. 8A and 8B without departing from the scope of this disclosure.

The method 800 includes steps performed at a training time 802, illustrated in FIG. 8A, and a runtime 804, illustrated in FIG. 8B. In some examples, the steps performed at the training time 802 occur in a training environment and the steps performed at runtime 804 occur in a deployed field environment. In other examples, at least a portion of the steps performed at the training time 802 and runtime 804 may occur concurrently or in the same environment.

Continuing with FIG. 8A, at 806, the method 800 includes receiving training data including a plurality of training data pairs, each training data pair including, as input, force sensor training data, wherein the force sensor training data is received from at least one force sensor of a wearable device, the at least one force sensor located between a user's foot and a surface, the user traversing that surface during a training session, or from a simulation or observation of one or more other force sensors, and as ground truth output, a label indicating at least one of a plurality of defined surface types. For example, the system 100 of FIG. 1 may be used to conduct the simulation or observation of one or more force sensors as described above.

At 808, the predicted classification of the run-time surface type may comprise one or more of a type of terrain or a slope of the surface. At 810, during the training phase 802, the force sensor training data may be received while the user is bearing at least one load of a plurality of defined loads, while simulating the at least one load, or while observing one or more other force sensors bearing the at least one load.

At 812, the method 100 includes training an AI model using the plurality of training data pairs to predict a classified surface type based on run-time force sensor data. At 814, the method 100 may include training a load-determining AI model using the force sensor training data as input and the ground-truth load classification as output to predict a run-time load classification based on the run-time force sensor data. For example, the load-determining AI model may be trained using the force sensor training data collected at steps 806 and/or 810.

With reference now to FIG. 8B, at 816, the method 800 includes, in the run-time phase 804, monitoring the run-time force sensor data from the at least one force sensor as the user is traversing a run-time surface type, wherein the run-time surface type is one of the plurality of defined surface types. At 818, the method 800 includes inputting the run-time force sensor data into the trained AI model to thereby cause the AI model to output a predicted classification of the run-time surface type. At 820, the predicted classification of the run-time surface type may comprise one or more of a type of terrain or a slope of the terrain.

At 822, the method 800 may include receiving the force sensor training data while the user is bearing a defined load, and determining one or more characteristics of a run-time load by contrasting a magnitude of the run-time force sensor data with a magnitude of the force sensor training data. At 824, determining the one or more characteristics of the run-time load may comprise determining one or more of a weight of the run-time load, a type of the run-time load, or a distribution of the run-time load on the user's body.

At 826 the method 800 may comprise inputting the run-time force sensor data into the trained load-determining AI model to thereby cause the load-determining AI model to output a predicted classification of a run-time load. At 828, the predicted classification of the run-time load may comprise one or more of a weight of the run-time load, a type of the run-time load, or a distribution of the run-time load on the user's body. At 830, at least one of the plurality of defined surfaces may be associated with a location, and the method 800 further comprises determining that the user is at the location based upon the classified surface type.

In this manner, one or more characteristics of a surface over which a user is traveling can be characterized based upon sensor data from a wearable device. The system and methods described above may be used to augment a computerized model of an activity (e.g., walking or running) with real-time surface characteristics, which can be used to accurately estimate one or more characteristics of the user, such as a person's bodyweight and gait, a pace, distance traveled, and calories consumed by a person while walking or running.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
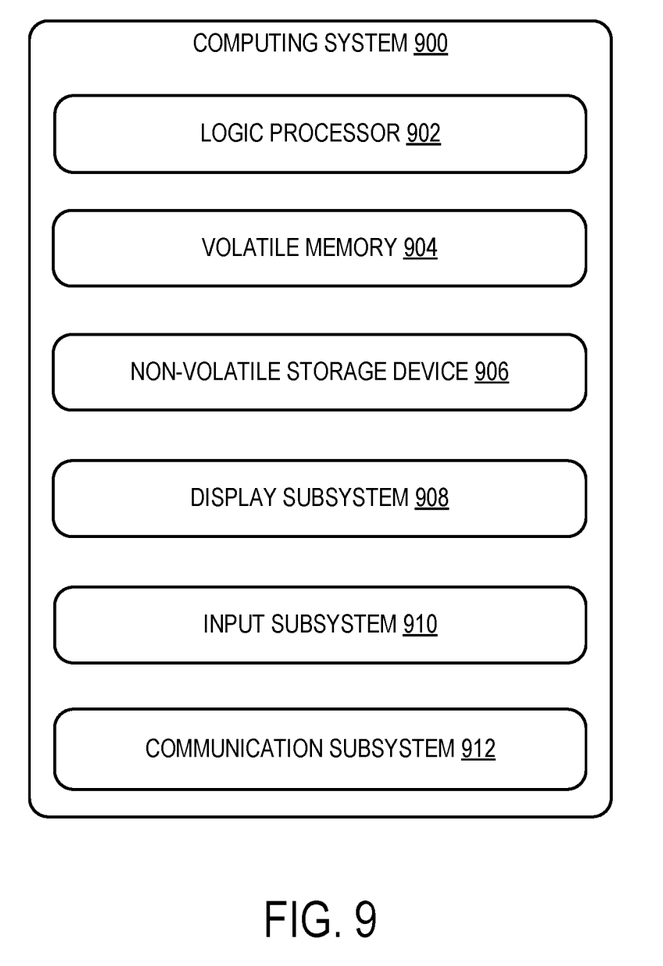
FIG. 9 shows a schematic diagram of an example computing system, according to one example embodiment.

FIG. 9 schematically shows an example of a computing system 900 that can enact one or more of the devices and methods described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices. In some examples, the computing system 900 may embody the monitoring server 103, the wearable device 102, or the wearable device 200.

The computing system 900 includes a logic processor 902 volatile memory 904, and a non-volatile storage device 906. The computing system 900 may optionally include a display subsystem 908, input subsystem 910, communication subsystem 912, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 900 typically implemented in software by a processor to perform a particular function using portions of volatile memory, which function involves transformative processing that specially configures the processor to perform the function. Thus, a program may be instantiated via logic processor 902 executing instructions held by non-volatile storage device 906, using portions of volatile memory 904. It will be understood that different programs may be instantiated from the same application, service, code block, object, library, routine, API, function, etc. Likewise, the same program may be instantiated by different applications, services, code blocks, objects, routines, APIs, functions, etc.

The term "program" may encompass individual or groups of executable files, data files, libraries, drivers, scripts, database records, etc.

When included, display subsystem 908 may be used to present a visual representation of data held by non-volatile storage device 906. The visual representation may take the form of a GUI. As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some examples, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. For example, the communication subsystem may be configured for communication via a wireless telephone network, or a wired or wireless local- or wide-area network. In some examples, the communication subsystem may allow computing system 900 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of strategies. As such, various acts illustrated and/or described may be performed in the sequence illustrated and/or described, in other sequences, in parallel, or omitted. Likewise, the order of the above-described methods may be changed.

The subject matter of the present disclosure includes all novel and non-obvious combinations and sub-combinations of the various methods, systems and configurations, and other features, functions, acts, and/or properties disclosed herein, as well as any and all equivalents thereof.

The invention claimed is:

1. A system, comprising:
 a wearable device comprising at least one force sensor located between a user's foot and a surface; and
 a computing device having a processor and associated memory storing instructions executable by the processor to:
  during a training phase,
   receive training data including a plurality of training data pairs, each training data pair including an input vector and a matched ground-truth label,
    wherein the input vector includes force sensor training data, wherein the force sensor training data is received from the at least one force sensor as the user is traversing the surface during a training session, or from a simulation or observation of one or more other force sensors, and
    wherein the matched ground-truth label indicates at least one of a plurality of defined surface types; and
   train an artificial intelligence (AI) model using the plurality of training data pairs to predict a classified surface type based on run-time force sensor data; and
  during a run-time phase,
   monitor the run-time force sensor data from the at least one force sensor as the user is traversing a run-time surface type, wherein the run-time surface type is one of the plurality of defined surface types; and
   input the run-time force sensor data into the trained AI model to thereby cause the AI model to output a predicted classification of the run-time surface type.

2. The system of claim 1, wherein the wearable device comprises a shoe or an insole.

3. The system of claim 2, wherein the wearable device comprises a first force sensor located between the user's heel and the surface, and a second force sensor located between the user's toe and the surface.

4. The system of claim 1, wherein the predicted classification of the run-time surface type comprises one or more of a type of terrain or a slope of the surface.

5. The system of claim 1, wherein the force sensor training data is obtained while the user is bearing a defined load, and wherein the instructions are further executable to determine one or more characteristics of a run-time load by contrasting a magnitude of the run-time force sensor data with a magnitude of the force sensor training data.

6. The system of claim 5, wherein the one or more characteristics of the run-time load comprise one or more of a weight of the run-time load, a type of the run-time load, or a distribution of the run-time load on the user's body.

7. The system of claim 1, wherein the instructions are further executable to:
 during the training phase,
  receive the force sensor training data while the user is bearing at least one load of a plurality of defined loads, while simulating the at least one load, or while observing one or more other force sensors bearing the at least one load;
  obtain a ground-truth load classification of the at least one load; and
  train a load-determining AI model using the force sensor training data as input and the ground-truth load classification as output to predict a run-time load classification based on the run-time force sensor data; and
 during the run-time phase,
  monitor the run-time force sensor data; and
  input the run-time force sensor data into the trained load-determining AI model to thereby cause the load-determining AI model to output a predicted classification of a run-time load.

8. The system of claim 7, wherein the predicted classification of the run-time load comprises one or more of a weight of the run-time load, a type of the run-time load, or a distribution of the run-time load on the user's body.

9. The system of claim 1, wherein the at least one force sensor comprises a load cell, a strain gauge, a force-sensitive resistor, or an inertial measurement unit.

10. The system of claim 1, wherein at least one of the plurality of defined surfaces is associated with a location, and wherein the instructions are further executable to determine that the user is at the location based upon the classified surface type.

11. At a computing device, a method for classifying a surface type, the method comprising:
during a training phase,
receiving training data including a plurality of training data pairs, each training data pair including an input vector and a matched ground-truth label,
wherein the input vector includes force sensor training data, wherein the force sensor training data is received from at least one force sensor of a wearable device, the at least one force sensor located between a user's foot and a surface, the user traversing that surface during a training session, or from a simulation or observation of one or more other force sensors, and
wherein the matched ground-truth label indicates at least one of a plurality of defined surface types; and
training an artificial intelligence (AI) model using the plurality of training data pairs to predict a classified surface type based on run-time force sensor data; and
during a run-time phase,
monitoring the run-time force sensor data from the at least one force sensor as the user is traversing a run-time surface type, wherein the run-time surface type is one of the plurality of defined surface types; and
inputting the run-time force sensor data into the trained AI model to thereby cause the AI model to output a predicted classification of the run-time surface type.

12. The method of claim 11, wherein the predicted classification of the run-time surface type comprises one or more of a type of terrain or a slope of the surface.

13. The method of claim 11, further comprising:
receiving the force sensor training data while the user is bearing a defined load; and
determining one or more characteristics of a run-time load by contrasting a magnitude of the run-time force sensor data with a magnitude of the force sensor training data.

14. The method of claim 13, wherein determining the one or more characteristics of the run-time load comprises determining one or more of a weight of the run-time load, a type of the run-time load, or a distribution of the run-time load on the user's body.

15. The method of claim 11, further comprising:
during the training phase,
receiving the force sensor training data while the user is bearing at least one load of a plurality of defined loads, while simulating the at least one load, or while observing one or more other force sensors bearing the at least one load;
obtaining a ground-truth load classification of the at least one load; and
training a load-determining AI model using the force sensor training data as input and the ground-truth load classification as output to predict a run-time load classification based on the run-time force sensor data; and
during the run-time phase,
monitoring the run-time force sensor data; and
inputting the run-time force sensor data into the trained load-determining AI model to thereby cause the load-determining AI model to output a predicted classification of a run-time load.

16. The method of claim 15, wherein the predicted classification of the run-time load comprises one or more of a weight of the run-time load, a type of the run-time load, or a distribution of the run-time load on the user's body.

17. The method of claim 11, wherein at least one of the plurality of defined surfaces is associated with a location, the method further comprising determining that the user is at the location based upon the classified surface type.

18. A system, comprising:
a wearable device comprising at least one force sensor located between a user's foot and a surface; and
a computing device having a processor and associated memory storing instructions executable by the processor to:
during a training phase,
receive training data including a plurality of surface training data pairs and a plurality of load training data pairs,
each surface training data pair including an input vector and a matched ground-truth label,
wherein the input vector includes force sensor training data, wherein the force sensor training data is received from the at least one force sensor as the user is traversing the surface during a training session, or from a simulation or observation of one or more other force sensors, and
wherein the matched ground-truth label indicates at least one of a plurality of defined surface types; and
each load training data pair including,
as input, the force sensor training data, wherein the force sensor training data is received from the at least one force sensor while the user is bearing at least one load of a plurality of defined loads, while simulating the at least one load, or while observing one or more other force sensors bearing the at least one load, and
as ground-truth output, a ground-truth load classification of the at least one load;
train a surface classification artificial intelligence (AI) model using the plurality of surface training data pairs to predict a classified surface type based on run-time force sensor data; and
train a load-determining AI model using the plurality of load training data pairs to predict a run-time load classification based on the run-time force sensor data; and
during a run-time phase,
monitor the run-time force sensor data from the at least one force sensor as the user is traversing a run-time surface type, wherein the run-time surface type is one of the plurality of defined surface types;
input the run-time force sensor data into the trained surface classification AI model to thereby cause the surface classification AI model to output a predicted classification of the run-time surface type; and input the run-time force sensor data into the trained load-determining AI model to thereby cause the load-determining AI model to output a predicted classification of a run-time load.

19. The system of claim 18, wherein the predicted classification of the run-time surface type comprises one or more of a type of terrain or a slope of the surface.

20. The system of claim 18, wherein the predicted classification of the run-time load comprises one or more of a weight of the run-time load, a type of the run-time load, or a distribution of the run-time load on the user's body.

\* \* \* \* \*